July 1, 1969 H. M. BAKER, JR 3,453,464

OSCILLATING RESONATOR

Filed March 19, 1968 Sheet 1 of 2

INVENTOR
HUGH M. BAKER, JR.

BY G. Turner Moller

ATTORNEYS

INVENTOR
HUGH M. BAKER, JR.

BY

G. Turner Moller

ATTORNEYS.

United States Patent Office 3,453,464
Patented July 1, 1969

3,453,464
OSCILLATING RESONATOR

Hugh M. Baker, Jr., Washington, D.C., assignor to HB Engineering Corp., Silver Spring, Md., a corporation of Maryland Continuation-in-part of application Ser. No. 565,430, July 15, 1966. This application Mar. 19, 1968, Ser. No. 714,221
Int. Cl. H02k 33/00, 35/00
U.S. Cl. 310—36 8 Claims

ABSTRACT OF THE DISCLOSURE

A resonator comprising a plurality of rigid pivotable members interconnected by a flexible member which is arranged to transmit pivotal movement of one of the members into counter-pivotal movement of the other member. In accordance with several embodiments of the invention, the pivotal members are arranged for movement about a single axis. Also in accordance with a number of embodiments of the invention, the flexible member extends from adjacent one end of one of the rigid members to adjacent the other end of the other pivotal member.

*Cross reference to related applications*

This application is a continuation-in-part of application S.N. 565,430, entitled Resonator Together With Method and Means for Varying the Frequency Thereof, filed July 15, 1966.

*Background of the invention*

This invention relates to resonators and filters of the electromechanical type.

An electromechanical resonator is disclosed in the aforementioned application which comprises a pair of rigid members arranged to pivot or rotate about the nodal axis thereof. The rigid members are interconnected by a bodily flexible member arranged to induce counter rotary movement between the rigid parts. The device disclosed in the aforementioned application is generally H-shaped in configuration with the flexible part or web being substantially smaller than the rigid parts.

It has been found desirable to provide a resonator of this general type which is adapted for low frequency operation. For example, it may be desirable to provide a sixty cycle resonator. One mode of accomplishing this desideratum is to make the flexible part or web of substantially greater length. It may be readily appreciated that the third part or web of the resonator disclosed in the aforementioned application may be made of any desirable length, it will be apparent that the device assumes substantially greater external dimensions and therefore sacrifices compactness to some extent. Another advantage of the invention is to provide a resonator or filter of given size which is operable at increased Q (quality) or selectivity.

*Summary of the invention*

In order to provide a compact low frequency resonator of the type generally shown in the aforementioned application, the web or flexible part is made substantially longer and is secured to the rigid members adjacent the end portions thereof on opposite sides of the pivot axis. This configuration allows a substantially longer web or flexible part and consequently allows low frequency operation while maintaining the compact nature of the resonator.

In accordance with all the embodiments of the invention the mass of the rotating members may be increased for any given external dimension of the resonator or the mass of the rotating members may remain the same with a decrease in the external dimensions of the device. This is accomplished by increasing the number of rotating masses connected to the web, by inclining the flexible part with respect to the rigid members or by positioning the flexible part out of the plane of the rigid members. It will be apparent to those skilled in the art that the increase of the mass of the rotating members increases the Q (quality) or selectivity of the resonator when the characteristics of the web remain the same.

It is accordingly an object of the invention to provide a low frequency compact resonator comprising a plurality of bodily rigid members arranged to rotate about the nodal axis thereof.

Another object of the invention is to provide a compact low frequency resonator comprising first and second bodily rigid members and a third bodily flexible member, connected to opposite end portions of the rigid members for transmitting rotary movement of one of the rigid members into counter rotary movement of the other member.

A still further object of the invention is to provide a resonator of increased quality or selectivity without changing the external dimensions of the device.

Further objects, advantages and important features of this invention will be apparent from a study of the specification following taken with the drawing which together describe, disclose, illustrate and show preferred embodiments of this invention and what is now considered and believed to be the best mode of practicing the principals thereof. Still other embodiments, modifications, procedures or equivalents may be apparent to those having the benefit of the teachings herein and such other embodiments, modifications, procedures or equivalents are intended to be reserved especially as they fall within the scope and breadth of the subjoined claims.

*Detailed description of the embodiments*

Figure 1:
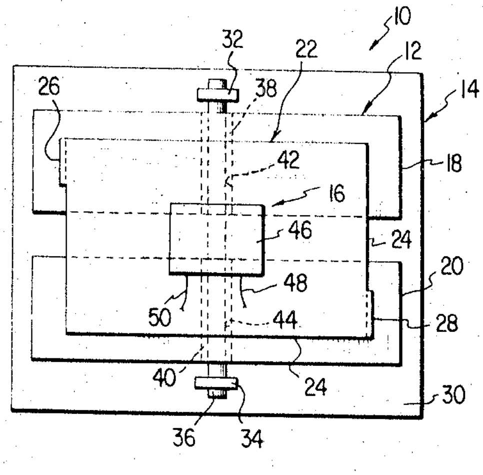
FIGURE 1 is a top plan view of one embodiment of the invention.

Reference is made to FIGURE 1 wherein there is shown a resonator 10 having as major components an oscillatable structure 12, support means 14 and means 16 for energizing the oscillatable structure 12.

The oscillatable structure 12 comprises first and second bodily rigid parts or members 18, 20 having substantially equal mass moments of inertia. The members 18, 20 are illustrated as rectangular in configuration, but it is to be understood that these elements may be of any suitable geometric shape, such as cylinders, externally threaded cylinders, externally threaded tubes, internally threaded tubes, dumbbells, cones or the like. Although it is preferred that the members 18, 20 be of the same geometrical shape for convenience of manufacture, such is not necessary so long as the members have substantially equal mass moments of inertia. The first and second rigid members 18, 20 are preferably made of a material having a relatively low coefficient of thermal expansion such as Invar or the like in order to make the resonant frequency of the structure 12 substantially independent of temperature. The mass moments of inertia of the rigid members 18, 20 may be adjusted in the manner shown in the aforementioned application by adjustably mounting an additional weight on the exterior of the rigid members 18, 20 or by adjustably mounting a weight in an internal passageway in the members 18, 20. The change of the mass moments of inertia of the members 18, 20 results in a change in the resonant frequency of the resonator 10.

The oscillatable structure 12 also comprises a bodily flexible third part of member 22 having a bodily flexible generally planar component 24 secured at one corner thereof by a depending leg 26 to the first rigid member 18 adjacent one end portion thereof. The diagonally opposite corner of the flexible component 24 is secured by a depending leg 28 to the other end portion of the second rigid member 20. The legs 26, 28 are positioned on the members 18, 20 such that any force applied to the legs 26, 28 results in substantially equal moments in the rigid members 18, 20.

The bodily flexible third part or web 22, and particularly the bodily flexible component 24 thereof, is preferably made of an isoelastic material having a relatively low thermal coefficient of elasticity such as Ni Span C or certain nickel-iron compounds. Alternatively, the planar component 24 may be laminated with a material having a positive thermal coefficient of elasticity and a material having a negative thermal coefficient of elasticity in order to achieve the desired temperature stability. A further alternative is to construct the planar component 24 of a material having a positive coefficient of elasticity in order to compensate for a positive coefficient of thermal expansion of the members 18, 20.

Figure 3:
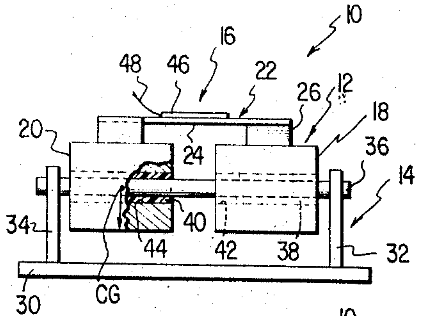
FIGURE 3 is an end elevational view of the embodiment of FIGURES 1 and 2, certain parts being broken away for clarity of illustration.

The support means 14 comprises a base or platform 30 having upstanding arms or brackets 32, 34 thereon. A pin or shaft 36 is rotatably mounted between the arms 32, 34 and carries suitable bushings or bearings 38, 40, which allow freedom of rotation between the members 18, 20 and the support 14. The bushings 38, 40 may conveniently be made of rubber or the like bonded to the shaft 35 and secured within a pair of bores 42, 44 in the first and second members 18, 20 to provide lateral stability. As shown in FIGURE 3, the axis of the shaft 36 intersects the centers of gravity of the rigid members 18, 20

The energizing means 16 may be of any suitable type to energize a resonator such as a magnetostrictive, electromagnetic mechanical or pneumatic arrangement, but is shown for illustrative purposes as a piezoelectric arrangement. The energizing means 16 accordingly comprises a piezoelectric element 46 provided with suitable electrical leads 48, 50. When a voltage of suitable polarity is applied to the leads 48, 50 the piezoelectric element 46 contracts thereby flexing the planar component 24 into the upwardly concave configuration shown in FIGURE 4.

Figure 4:
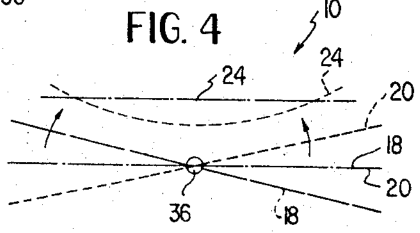
FIGURE 4 is a schematic view of the embodiment of FIGURES 1–3 which illustrates the position of the various parts at rest and at the completion of one half cycle of operation.
Figure 2:
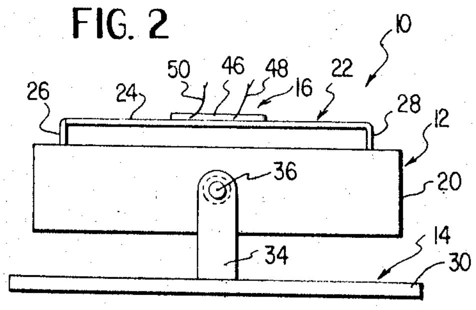
FIGURE 2 is a side elevational view of the embodiment of FIGURE 1.
Figure 5:
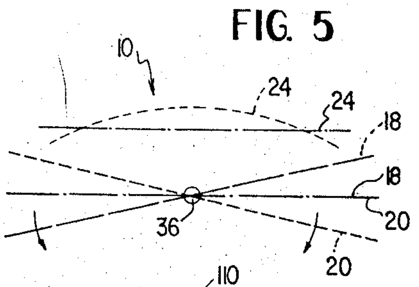
FIGURE 5 is another schematic view of the embodiment of FIGURES 1–3 illustrating the position of the various parts at rest and at the completion of one full cycle of operation.

Since the planar component 24 is secured by the leg 26 to the first rigid member 18, the member 18 rotates in a clockwise direction about the axis of the shaft 36 as seen in FIGURE 4. Since the planar component 24 is secured by the leg 26 to the second rigid member 20 on the opposite side of the shaft 36, the member 20 undergoes counterclockwise rotation about the axis of the shaft 36 as shown in FIGURE 4. When a voltage of opposite polarity is applied to the leads 48, 50 the planar component 24 assumes the upwardly convex configuration shown in FIGURE 5. Because of the attachment of the legs 26, 28 on opposite sides of the shaft 36, the first rigid member 18 rotates in a counterclockwise direction about the axis of the shaft 36 while the second rigid member 20 rotates in a clockwise direction about the same axis.

Since the first and second rigid members 18, 20 have substantially equivalent mass moments of inertia and since the attachment of the legs 26, 28 are such to produce equal mass moments in the rigid members 18, 20 and since the members 18, 20 are mounted for rotation about the respective centers of gravity hereof the oscillatable structure 12 operates surprisingly independently of any forces applied to the support means 14.

Figure 6:
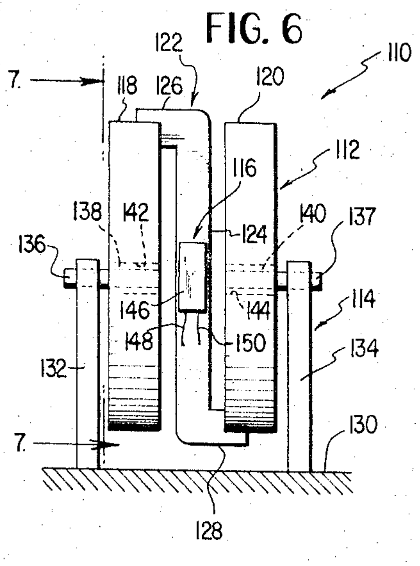
FIGURE 6 is a side elevational view of another embodiment of the invention.
Figure 7:
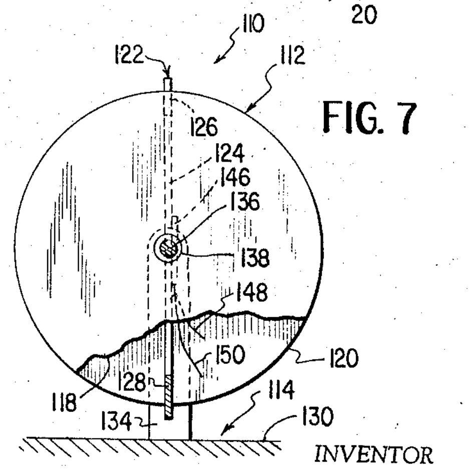
FIGURE 7 is a cross-sectional view of the embodiment of FIGURE 6 taken substantially along line 7—7 thereof as viewed in the direction indicated by the arrows.

Attention is now directed to FIGURES 6 and 7 wherein there is shown a resonator 110 having as major components an oscillatable structure 112, support means 114 and energizing means 116. The oscillatable structure 112 comprises first and second rigid disc shaped members 118, 120. The disc shaped members 118, 120 have substantially equal mass moments of inertia and may be made of a suitable material as previously outlined. The oscillatable structure 112 comprises a third bodily flexible part or member 122 comprising a central generally planar bodily flexible component 124 secured by a first L-shaped extension 126 to the first rigid disc 118 adjacent one end thereof and by a second L-shaped extension 128 to the second disc 120 adjacent the other end thereof. It will accordingly be apparent that the third bodily flexible member 122 is operative to transmit rotary movement of one of the discs into counter rotary movement of the other disc.

The support means 114 comprises a base or platform 130 from which a pair of arms or brackets 132, 134 extend. A pair of stub shafts 136, 137 are rotatably mounted on the end portions of the arms or brackets 132, 134 and intersect the centers of gravity of the rigid discs 118, 120. Affixed about the stub shafts 136, 137 are a pair of rubber bushings 138, 140 which are bonded or otherwise secured to bores 142, 144 in the rigid discs 118, 120. Although the axis of the stub shafts 136, 137 are illustrated as axially aligned, the stub shafts 136, 137 may be axially offset.

The energizing means 116 may be of any suitable type as previously mentioned but is illustrated as comprising a piezoelectric element 146 having a pair of leads 148, 150 providing access to a source of electrical potential.

Figure 8:
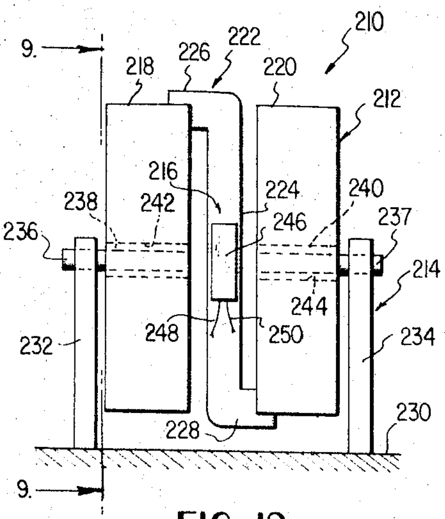
FIGURE 8 is a front elevational view of another embodiment of the invention.
Figure 9:
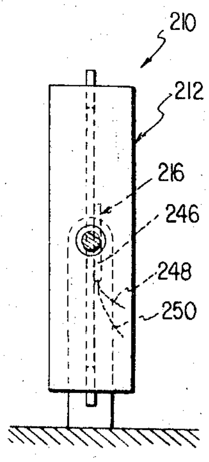
FIGURE 9 is a cross-sectional view of the embodiment of FIGURE 8 taken substantially along line 9—9 thereof as viewed in the direction indicated by the arrows.
Figure 10:
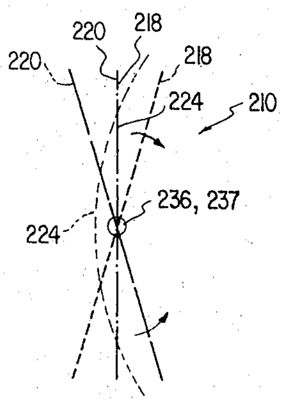
FIGURE 10 is a schematic view illustrating the position of the various elements of the embodiments of FIGURES 6–9 at rest and at the completion of one half cycle of operation.
Figure 12:
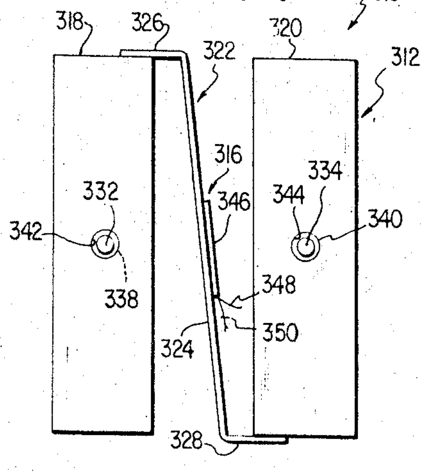
FIGURE 12 is a front elevational view of another embodiment of the invention.
Figure 13:
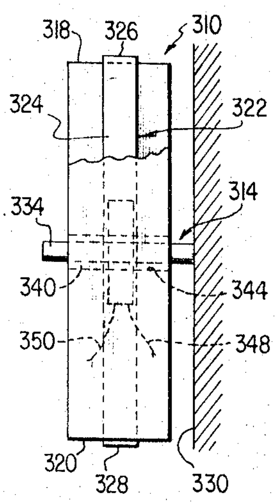
FIGURE 13 is a side elevational view of the embodiment of FIGURE 12, certain parts being broken away for clarity of illustration.
Figure 11:
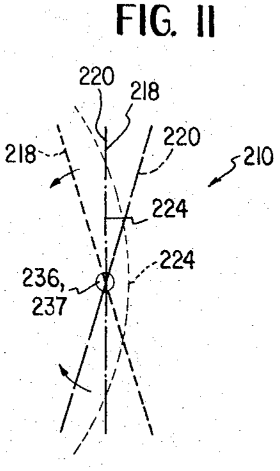
FIGURE 11 is another schematic view of the embodiments of FIGURES 6–9 illustrating the various parts at rest and at the completion of one full cycle of operation.

Referring to FIGURES 8–11, another resonator 210 is illustrated as comprising an oscillatable structure 212, support means 214 and energizing means 216. The oscillatable structure 212 comprises a first rigid bar or member 218 of generally rectangular configuration and a second rigid bar 220 of similar configuration. Since the remaining components of the embodiments of FIGURES 8–9 are identical with similar components of the embodiments of FIGURES 6–7 further explanation is believed to be superfluous although similar reference characters have been added to the drawing. The reference characters of the embodiments of FIGURES 8 and 9 have been applied to the schematic showings of FIGURES 10 and 11 although it should be understood that FIGURES 10 and 11 are also representative of the embodiments of FIGURES 6 and 7.

When a voltage of given polarity is applied to the piezoelectric element 246, the element 246 expands to move the flexible component 224 into the rightwardly concave configuration shown in FIGURE 10. Because of the connection between the extensions 226, 228 and the rigid bars 218, 220, the first bar 218 rotates in a clockwise direction about the axis of the shafts 236, 237 while the second bar 220 rotates in a counterclockwise direction about the same axis. When the polarity of the electrical signal imparted to the piezoelectrical element 246 is reversed the piezoelectrical element 246 contracts to move the flexible component 224 into the rightwardly convex configuration between the third member 222 and the first and second members 218, 220, the first rigid member 218 rotates in a counterclockwise direction about the axis of the shafts 236, 237 while the second rigid member 220 rotates in a clockwise direction thereabout.

Reference is now made to FIGURES 12–15 wherein there is shown a resonator 310 constituting another embodiment of the invention. The resonator 310 comprises as major components an oscillatable structure 312, support means 314 and energizing means 316. The oscillatable structure 312 comprises a first rigid part or member 318 and a second rigid part or member 320. Although the rigid members 318, 320 are illustrated as a generally rectangular configuration, it should be understood that the other configurations are practicable as previously mentioned. As is true with all embodiments herein disclosed, the first and second members 318, 320 have substantially equivalent mass moments of inertia.

The oscillatable structure 312 also comprises a third bodily flexible member or part 322 comprising a bodily flexible component 324 which is illustrated as generally planar. The bodily flexible component 324 is secured at one end thereof by an L-shaped extension 326 to one end portion of the first member 318. The other end of the bodily flexible component 324 is secured by a second L-shaped extension 328 to the opposite end of the second rigid member 320. It will accordingly be apparent that the members 318, 320 are interconnected for counter rotary movement.

The support means 114 comprises a base 330 from which extend a pair of shafts 332, 334. The shafts 332, 334 are mounted in the base for rotational movement by any suitable means (not shown). Secured to each of the shafts 332, 334 is a rubber bushing 338, 340 which is in turn bonded or otherwise secured to a bore 342, 344 in the first and second members 318, 320. The shafts 332, 334 intersect the respective centers of gravity of the rigid members 318, 320 and enable the rigid members 318, 320 to rotate about the centers of gravity thereof.

Figure 14:
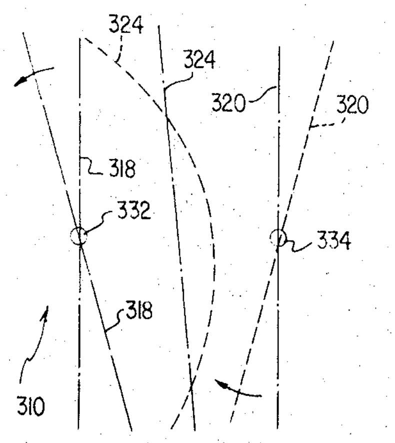
FIGURE 14 is a schematic view of the embodiment of FIGURES 12 and 13 illustrating the various parts at rest and at the completion of one half cycle of operation.
Figure 15:
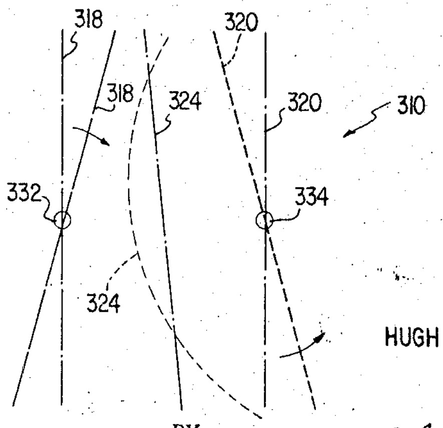
FIGURE 15 is another schematic illustration of the embodiment of FIGURES 12 and 13 illustrating the various parts at rest and at the completion of one full cycle of operation.

The energizing means 316 may be of any suitable type as previously mentioned but is illustrated as comprising a piezoelectric element 346 having suitable electrical leads 348, 350. When an electrical potential of given polarity is applied to the leads 348, 350, the piezoelectrical element 346 expands to move the bodily flexible component 324 into the rightwardly convex configuration shown in FIGURE 14. Because of the disposition of the extensions 326, 328, the first member 318 is rotated in a counterclockwise direction while the second member 320 is rotated in a clockwise direction as shown in FIGURE 14. When an electrical potential of opposite polarity is applied to the piezoelectric element 346, the bodily flexible component 324 is moved into the rightwardly concave configuration shown in FIGURE 15. Because of the arrangement of the connection between the first member 318 and the bodily flexible member 322 and the connection between the bodily flexible member 322 and the second member 320, the first member 318 is rotated in a clockwise direction about the axis of the shaft 332 while the second member 320 is rotated in a counter clockwise direction about the axis of the shaft 334.

While the invention has been shown, illustrated, described and disclosed in terms of embodiments or modifications which it has assumed in practice, the scope of the invention should not be deemed to be limited by the precise embodiments or modifications herein shown or disclosed, such other embodiments or modifications intended to be reserved especially as they fall within the scope of the claims here appended.

I claim:

1. A resonator comprising
first and second bodily rigid parts having substantially equal mass moments of inertia;
a bodily flexible third part connected to the first part at a first location and to the second part at a second location for transmitting rotary movement of the first part into counter rotary movement of the second part, the first and second locations being spaced from the nodal axes of the first and second parts an appropriate distance to produce equal mass moments in the rigid parts, the first location being on one side of the nodal axis of the first part and the second location being on the other side of the nodal axis of the second part;
means supporting the first and second parts to enable the same to rotate about the nodal axes of the rigid parts, the nodal axes of the first and second parts intersecting the respective centers of gravity thereof; and
means for inducing oscillatory movement of the first and second parts.

2. The resonator of claim 1 wherein
the rigid parts are elongate.

3. The resonator of claim 1 wherein
the rigid parts are generally disc shaped.

4. The resonator of claim 1 wherein
the first location is positioned adjacent one end of the first part and the second location is positioned adjacent the other end of the second part.

5. The resonator of claim 1 wherein
the first location is positioned between the nodal axis and one end of the first part and the second location is positioned between the nodal axis and the other end of the second part.

6. The resonator of claim 1 wherein
the third part is disposed between the first and second parts.

7. The resonator of claim 1 wherein
the third part is laterally spaced from the axes.

8. The resonator of claim 1 wherein the supporting means is independent of the third part.

References Cited

UNITED STATES PATENTS

| | | | |
|---|---|---|---|
| 2,838,695 | 6/1958 | Thurston | 310—8.1 |
| 2,838,696 | 6/1958 | Thurston | 310—8.1 |
| 2,939,971 | 6/1960 | Holt | 310—15 |
| 2,978,597 | 4/1961 | Harris | 310—8.2 |
| 3,091,708 | 5/1963 | Harris | 310—8.2 |
| 3,113,463 | 12/1963 | Holt | 310—25 XR |
| 3,277,394 | 10/1966 | Holt et al. | 310—24 XR |
| 3,308,313 | 3/1967 | Favre | 58—23 XR |
| 3,372,351 | 3/1968 | Börner et al. | 333—71 |

MILTON O. HIRSHFIELD, *Primary Examiner.*

D. F. DUGGAN, *Assistant Examiner.*

U.S. Cl. X.R.

310—82; 333—71